Figure 1:
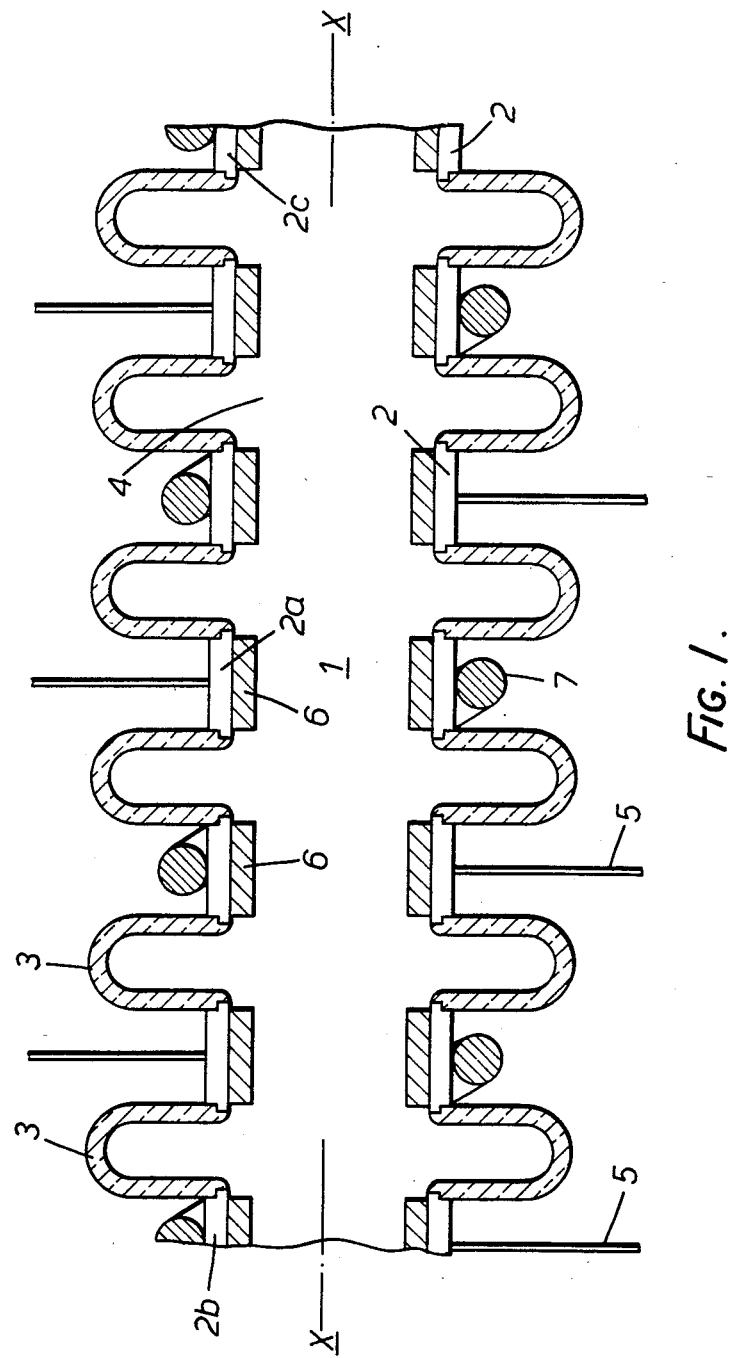

United States Patent [19]
Donaldson et al.

[11] Patent Number: 4,559,466
[45] Date of Patent: Dec. 17, 1985

[54] METAL VAPOR SEGMENTED DISCHARGE TUBES

[75] Inventors: Timothy P. Donaldson, Great Totham, England; Colin A. Pirrie, Alloa; Arthur Maitland, St. Andrews, both of Scotland

[73] Assignee: English Electric Valve Company Limited, Chelmsford, England

[21] Appl. No.: 563,459

[22] Filed: Dec. 20, 1983

[51] Int. Cl.[4] .......................... H01J 1/02; H01S 3/02
[52] U.S. Cl. .................................... 313/15; 313/245; 313/246; 372/34; 372/56; 372/62
[58] Field of Search ................ 313/15, 573, 634, 631, 313/632, 307, 245, 246, 249, 250, 283; 372/34, 62, 61, 56

[56] References Cited

U.S. PATENT DOCUMENTS

| 3,501,714 | 3/1970 | Myers et al. | 372/62 X |
| 3,742,378 | 6/1973 | Timmermans | 372/34 X |
| 3,798,486 | 3/1974 | Hernquist | 372/62 X |
| 3,868,593 | 2/1975 | Fukuda et al. | 372/62 X |

FOREIGN PATENT DOCUMENTS

| 2203188 | 5/1974 | France . |
| 2321788 | 3/1977 | France . |
| 1284864 | 8/1972 | United Kingdom . |
| 1336667 | 11/1973 | United Kingdom . |
| 2126413A | 3/1984 | United Kingdom . |

OTHER PUBLICATIONS

Japanese Journal of Applied Physics, vol. 18, No. 11, Nov. 1979, pp. 2111–2119.
IBM Technical Disclosure Bulletin, vol. 19, No. 9, Feb. 1977, L. W. Bassetti and S. J. Keene, Laser Preheating.

Primary Examiner—David K. Moore
Assistant Examiner—K. Wieder
Attorney, Agent, or Firm—Spencer & Frank

[57] ABSTRACT

Conventional discharge tubes comprise electrodes within a separate containing vessel. The electrodes are joined to an external circuit by electrical conductors which pass through the vessel wall via an insulated side arm. Such a construction has disadvantages in that careful manufacture is required and it is also difficult to produce a desired distribution of the active medium in a laser and maintain a stable optimum temperature. In an attempt to reduce these problems the invention provides a discharge vessel which comprises electrical conductors and insulators arranged alternately so that a separate discharge vessel is not required. Since the discharge vessel is partially thermally conducting, temperature control is facilitated by its fast response to stabilizing controls, heat being supplied from an external source. When metal is used as all or part of the active medium, the electrodes may be lined on their inner surfaces with the metal and each of the electrodes can be controlled independently from the others to obtain a desired distribution of metal vapor.

17 Claims, 2 Drawing Figures

METAL VAPOR SEGMENTED DISCHARGE TUBES

This invention relates to improvements in discharge tubes and in particular laser discharge tubes of the metal vapour type wherein the active medium is a metal vapour or a mixture of a gas and a metal vapour, for example helium and cadmium.

Laser discharge tubes are usually either "positive column" or "hollow cathode" type. The former uses a long positive column part of a d.c. discharge and the hollow cathode tube uses a negative glow part of a d.c. discharge.

The conventional hollow cathode tube comprises a discharge vessel which surrounds electrodes and within which the active medium is contained. The electrodes are arranged coaxially about the optic axis and constitute the region where a discharge is produced and where laser action occurs.

There are certain disadvantages concerning conventional hollow cathode tubes.

Long hollow cathodes are known to be unstable. Any small change in the discharge conditions, such as a fluctuation in temperature, produces deviation from optimum conditions and may result in greater disturbances, perhaps leading to interruption of the discharge and the cessation of laser action.

It is also difficult to provide effective temperature control whereby conditions remain optimized, more particularly since the heating effect provided by the discharge itself is usually relied upon to provide temperature control.

A further problem arises from the construction of the conventional tube, which has to accommodate conductors which are necessary for transmitting current from a supply outside the discharge vessel to the electrodes in the tube. Since the electrodes are contained within the tube each conductor must pass through the wall of the discharge vessel via an insulated side arm, where it is sealed in position. The temperature required within the discharge vessel may be in the region of a few hundreds of degrees Celsius, introducing large temperature gradients. The conductors passing through the vessel wall break the coaxial symmetry at the electrodes and discharge vessel so that the seals experience uneven stresses due to the temperature gradients. The insulated side arm must be constructed extremely carefully so that it is capable of withstanding these effects and is therefore expensive to manufacture.

Another problem more particularly experienced with metal vapour laser discharge tubes is a reduction in the amount of metal available during operation of the laser. The metal is commonly stored in a side arm which is transverse to the main discharge vessel and which opens onto it. When the laser is operating the side arm is heated and the metal vaporizes and enters the main body of the discharge vessel, which it then travels along by diffusion and electrophoresis. Electrophoresis is the effect whereby ions move towards electrodes of opposite charge to the ions and in the case of metal ions is generally cataphoresis. When the metal vapour has travelled the length of the discharge vessel it is collected at a heat sink, which is a similar structure to the side arm and also extends transversely to the discharge vessel. Thus, in time, the reservoir of metal stored in the side arm becomes exhausted and the laser ceases to function. The side arm and heat sink are also bulky and vulnerable because they protrude from the main body of the tube. The vapour source may also be remote from those parts of the discharge tube where it is required.

Another disadvantage of the conventional metal vapour discharge tube is the reliance on diffusion and electrophoresis to distribute the metal vapour within the tube and the consequent lack of control over distribution. Not all the metal vapour enters the heat sink and there is condensation of metal vapour on cooler surfaces within the discharge tube such as end mirrors and windows within the discharge vessel but lying outside the active volume. Deposition of metal vapour on windows of the discharge tube introduces scattering losses which may terminate laser action.

This invention seeks to provide an improved metal vapour discharge tube in which one or more of the above problems are reduced or eliminated.

According to this invention a metal vapour segmented discharge tube comprises a plurality of tubular electrodes each surrounding the path of a discharge through said tube the electrodes being anodes and cathodes arranged alternately along the length of said tube and so arranged that at least one of them may be subjected to a heating effect controlled from outside of the tube.

It is possible to pass heating current, controllable from outside of said tube, through the, or each of the, tubular electrodes which are to be subjected to a heating effect but this is not preferred however. Preferably said plurality of tubular electrodes are so arranged that at least one of them may be subjected to a heating effect, deriving from a heat source external to said tube.

In one example of a tube in accordance with the invention the said heating effect is produced by one or more heating coils the turns of which surround the tube. In another example of a tube in accordance with the invention the tube is surrounded by an envelope, the cavity formed between the tube and the envelope containing a fluid, which is preferably oil. This tends to give a thermally stable environment for the tube since the thermal capacity of the oil is large.

Preferably all of said tubular electrodes are so arranged whereby they may be subjected to a heating effect controlled from outside of the tube, in which case where said heating effect has provided heating coil means, preferably a single coil is utilised of which at least part of a turn surrounds at least part of each tubular electrode.

Preferably the tubular electrodes are separated by interposed insulators, the electrodes and insulators together forming part of the external envelope of the tube.

The insulators may be of any suitably electrically insulating material, for example, glass or ceramic.

Preferably at least said one of said tubular electrodes includes therewithin a source of metal vapour so located that it may be heated by the heating effect to which said electrode may be subjected.

Preferably said plurality of tubular electrodes are so arranged that the potentials thereof during operation may be adjusted so as to achieve a desired distribution of potentials.

Preferably said tube has an odd number of electrodes, the centre one thereof being so arranged as to operate with a potential whose polarity is opposite to that of the potentials of the end electrodes.

The invention is further described by way of example with reference to the accompanying drawings in which FIG. 1 illustrates by way of a longitudinal cross-section part of one metal vapour segmented laser discharge tube in accordance with the present invention, and FIG. 2 illustrates, again by way of a longitudinal cross-section, another metal vapour segmented laser discharge tube in accordance with the present invention.

With reference to FIG. 1 a helium-cadmium laser includes a discharge vessel 1 constructed in accordance with the invention. The discharge vessel 1 comprises electrodes 2 and glass insulators 3 which are tubular about a common axis X and lie adjacent to one another. The electrodes 2 and insulators 3 are arranged alternately along the axis X, neighbouring sections overlapping to form a mechanically strong structure. The electrodes 2 are cylindrical and the insulators 3 are folded away from the axis X.

By forming the envelope of the electrode and insulator elements a separate containing vessel or electrode enclosing sleeve is not required. The electrodes are accessible for heating.

The electrodes 2 and the insulators 3 enclose a cavity which is along the axis X and comprises the active volume 4 where discharge and laser action occur during operation.

Each electrode 2 is connected to a power supply (not shown) via a conductor 5 in such a way that each electrode 2 may be controlled as to electrical potential, independently from the rest. The electrodes 2 are alternately cathodes and anodes along the length of the discharge vessel 1.

Cadmium employed in the active medium is introduced in the discharge vessel 1 in the form of tubes 6 of the metal which line the inner surface of each electrode 2. A coil 7 surrounds the discharge vessel 1 and provides heating for the discharge, the heat being transmitted through the electrodes 2, as will be seen part of a turn of the coil 7 surrounds a part of each electrode 2. Because the electrodes 2 admit to close relationship with the turns of the coil 7, the problem of maintaining optimum temperatures tends to be reduced. The cadmium is vaporized by heat from the coil 7 which is also used to control the temperature within the discharge vessel 1.

There are an odd number of electrodes 2. The central electrode 2a is a cathode and the electrodes 2b and 2c at each end of the discharge vessel 1 are anodic. Thus the positive cadmium ions are kept within the active volume 4 by cataphoresis, reducing condensation of the metal on any optical components located at the ends of the discharge vessel 1.

As already mentioned each electrode 2 may be controlled independently from the rest. This enables individual electrodes to be electrically connected in a variety of circuit configurations, none of which are here represented, depending on application, designed to optimize the distribution of components comprising the active medium and in particular the distribution of metal vapour or metal ions.

Providing for the source of metal vapour in the form of tubes 6 forming linings within each heatable electrode 2 tends to allow for a distribution of metal vapour which does not rely on electrophoretic processes to the same extent as is the case with conventional tubes, and which aids in the production of a uniform distribution by both vaporization and sputtering processes. Furthermore the metal vapour path length to the centre of the discharge is never any greater than the radius of the discharge tube and thus the response time to any stabilizing control tends to be short. This tends to result in a greater control over the distribution of the metal vapour or ions than is the case with conventional discharge tubes.

By folding the insulators 3, as described above, a relatively large area of insulator is provided for a given axial length, thus reducing the tendency for short circuiting conductive paths to be formed by the condensation of the metal vapour on the internal surface of the insulators.

Figure 2:
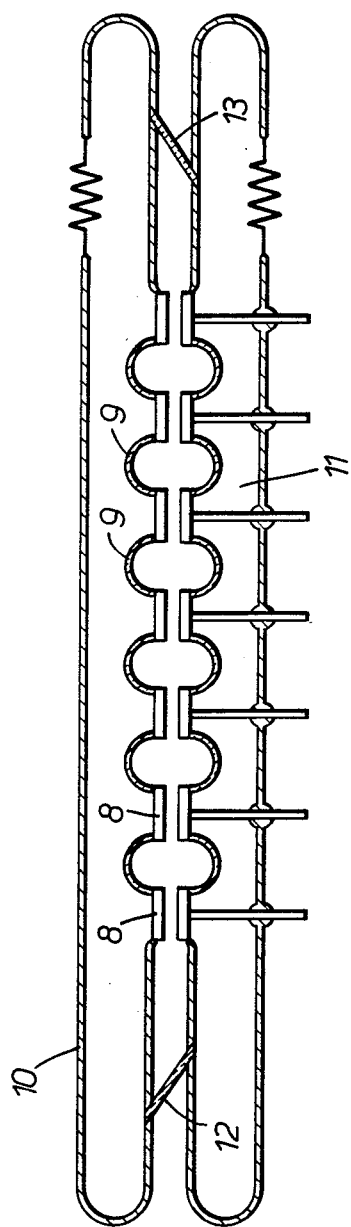

Referring to FIG. 2 the metal vapour segmented discharge tube for a laser shown therein comprises electrodes 8 and insulators 9 surrounded by a wall 10 which encloses a cavity 11 containing oil. The oil is suitable for a range of temperatures of the discharge tube up to about 400° C. The relatively large thermal capacity of the oil gives the thermal stability that is necessary for stable output of the laser radiation.

The tube includes two Brewster angled windows 12 and 13, one at each end. The wall 10 is arranged to be in thermal contact with the windows 12 and 13 thus inhibiting condensation of metal vapour on them by maintaining them at a similar temperature to the rest of the tube.

We claim:

1. A metal vapour segemented discharge tube having an external envelope and comprising a plurality of tubular electrodes, each of said electrodes surrounding the path of a discharge through said tube, said electrodes being anodes and cathodes arranged alternately along the length of the tube, all of said electrodes forming respective parts of said external envelope and being so arranged that at least one of them may be subjected to a heating effect controlled from outside of the tube.

2. A tube as claimed in claim 1 and wherein said plurality of tubular electrodes are so arranged that at least one of them may be subjected to a heating effect, deriving from a heat source external to said tube.

3. A tube as claimed in claim 1 and wherein said plurality of tubular electrodes are so arranged that heating current, controllable from outside of said tube, may be passed through at least one of said tubular electrodes which is to be subjected to a heating effect.

4. A tube as claimed in claim 1 and wherein said heating effect is produced by at least one heating coil, the turns of which surround the tube.

5. A tube as claimed in claim 4 and wherein all of said tubular electrodes are so arranged whereby they may be subjected to a heating effect controlled from outside of the tube and wherein a single coil is utilised of which at least part of a turn surrounds at least part of each tubular electrode.

6. A tube as claimed in claim 1 and surrounded by a wall, the cavity formed between the tube and the wall containing a fluid.

7. A tube as claimed in claim 6 and wherein the fluid is an oil.

8. A tube as claimed in claim 6 including windows arranged to be in thermal contact with the wall.

9. A tube as claimed in claim 1 and wherein the tubular electrodes are separated by interposed insulators, the electrodes and insulators together forming part of the external envelope of the tube.

10. A tube as claimed in claim 9 and wherein the insulators are of glass or ceramic material.

11. A tube as claimed in claim 1 and wherein at least said one of said tubular electrodes includes therewithin a source of metal vapour so located that it may be heated by the heating effect to which said electrode may be subjected.

12. A tube as claimed in claim 1 and wherein said plurality of tubular electrodes are so arranged that the potentials thereof during operation may be adjusted so as to achieve a desired distribution of potentials.

13. A tube as claimed in claim 1 and having an odd number of electrodes, the centre one thereof being so arranged as to operate with a potential whose polarity is opposite to that of the potentials of the end electrodes.

14. A laser arrangement including a metal vapor segmented discharge tube having an external envelope and comprising a plurality of tubular electrodes, each of said electrodes surrounding the path of a discharge through said tube, said electrodes being anodes and cathodes arranged alternately along the length of the tube, all of said electrodes forming respective parts of said external envelope and being so arranged that at least one of them may be subjected to a heating effect controlled from outside of the tube.

15. A tube as claimed in claim 1 and wherein said plurality of tubular electrodes are so arranged that heating current, controllable from outside of said tube, may be passed through at least two of said tubular electrodes which are to be subjected to a heating effect.

16. A tube as claimed in claim 1 and wherein said heating effect is produced by a plurality of heating coils, the turns of which surround the tube.

17. A tube as defined in claim 1 wherein all of said anodes and cathodes have identical dimensions transverse to the length of said tube.

* * * * *